United States Patent [19]

Steele et al.

[11] Patent Number: 4,532,168

[45] Date of Patent: Jul. 30, 1985

[54] HEAT SHRINKABLE COVERING

[75] Inventors: Robert E. Steele, Mississauga; Dilip K. Tailor, Bramalea; Rajni R. Lakhani, Rexdale, all of Canada

[73] Assignee: Shaw Industries Limited, Rexdale, Canada

[21] Appl. No.: 611,872

[22] Filed: May 18, 1984

[30] Foreign Application Priority Data

May 25, 1983 [CA] Canada ................................. 428834

[51] Int. Cl.³ .......................... F16L 21/06; B32B 3/04; B32B 3/06; B32B 3/08
[52] U.S. Cl. ........................................ 428/99; 428/36; 428/119; 428/129; 428/192; 428/194; 428/910; 428/139; 138/166; 138/167; 138/168; 174/DIG. 8; 174/92
[58] Field of Search .................. 428/36, 99, 129, 119, 428/120, 192, 194, 910, 139; 138/166, 167, 168; 174/DIG. 8, 92

[56] References Cited

U.S. PATENT DOCUMENTS

| | | | |
|---|---|---|---|
| 2,839,596 | 7/1958 | Cheney et al. | 174/92 |
| 3,574,313 | 4/1971 | Tanaka | 138/99 |
| 3,717,717 | 2/1973 | Cunningham et al. | 174/73 R |
| 4,241,119 | 12/1980 | Smart | 428/36 |
| 4,241,234 | 12/1980 | Haeder | 174/92 |
| 4,276,909 | 7/1981 | Biscop | 138/167 |
| 4,371,578 | 2/1983 | Thompson | 428/192 |
| 4,379,473 | 4/1983 | Kunze | 138/167 |
| 4,396,656 | 8/1983 | Still et al. | 428/36 |
| 4,442,155 | 4/1984 | Foertsch et al. | 428/36 X |

FOREIGN PATENT DOCUMENTS

| | | |
|---|---|---|
| 81191 | 6/1983 | European Pat. Off. . |
| 3048051 | 7/1982 | Fed. Rep. of Germany . |
| 3135766 | 4/1983 | Fed. Rep. of Germany . |

Primary Examiner—Alexander S. Thomas
Attorney, Agent, or Firm—Ridout & Maybee

[57] ABSTRACT

A heat shrinkable covering in the form of a sheet which is heat shrinkable in a longitudinal direction, and a stiffening member connected at each of two longitudinally spaced transversely extending superimposable zones of the sheet. One stiffening member has holes and the other studs in the form of arm portions which are insertable through the holes to secure the stiffening members together. The arm portions can be flattened down onto the outside of the covering to retain the stiffening members together while reducing risk of the studs interfering with items such as cables adjacent the covered article. Preferably the studs have a resiliently compressible head portion which snap fits into holes formed through the sheet adjacent the holes in the stiffening member to facilitate locating the overlapped zones of the sheet relative to one another. In use, the sheet is wrapped around an article, the stiffening members are engaged together, and the sheet is then heat shrunk. The stiffening members support the juxtaposed edges of the sheet at points intermediate the coupling points, thus resisting the tendency for the edges of the sheet to separate as a result of the hoop stresses generated in the sheet on shrinking.

35 Claims, 13 Drawing Figures

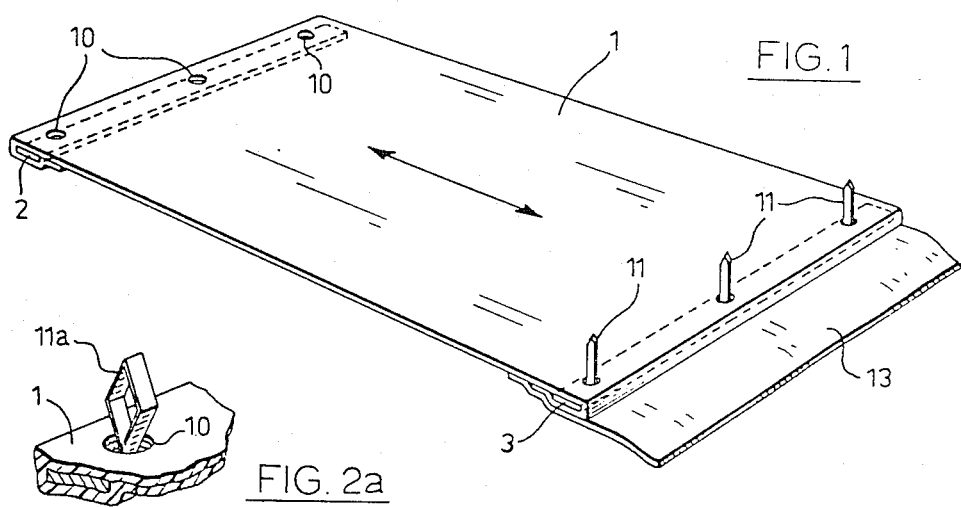
FIG. 1
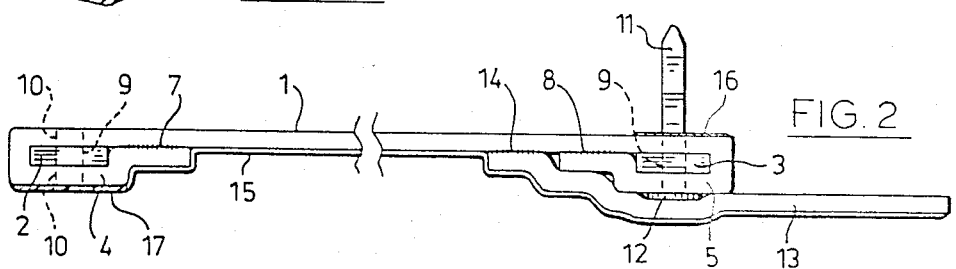
FIG. 2a
FIG. 2
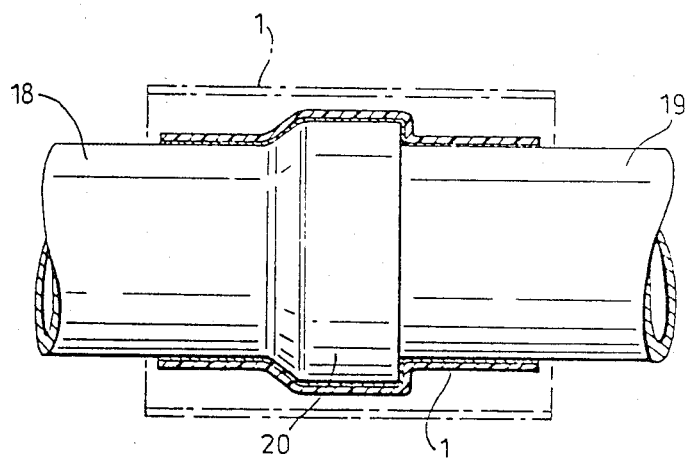
FIG. 5

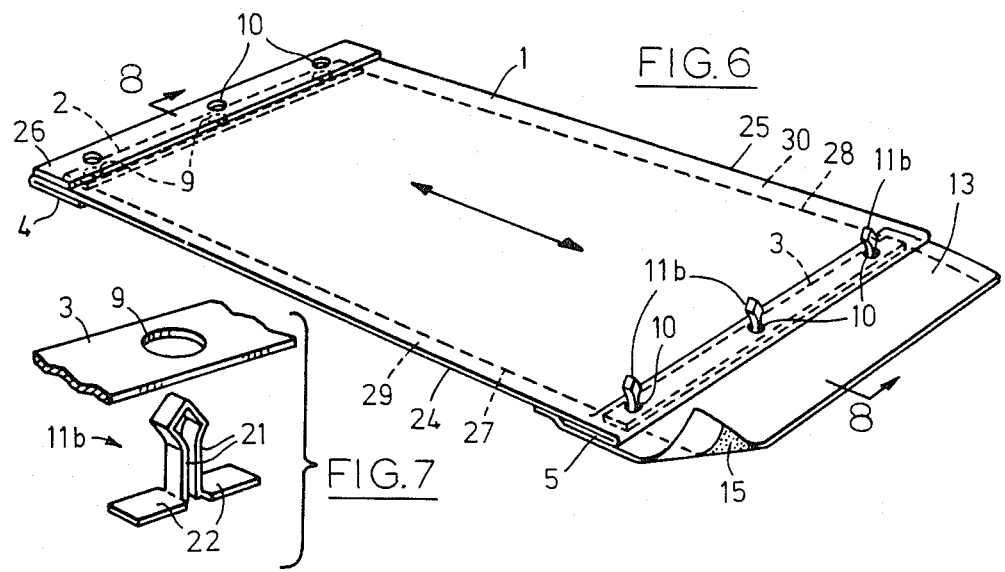
FIG. 6
FIG. 7
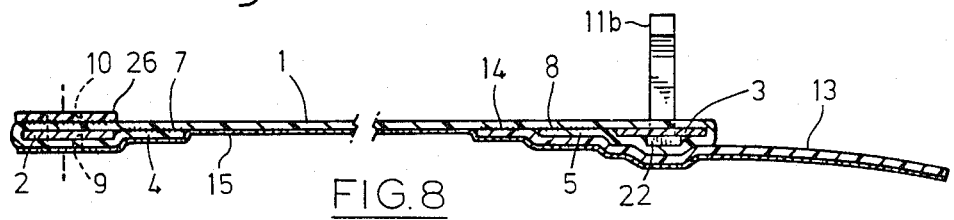
FIG. 8
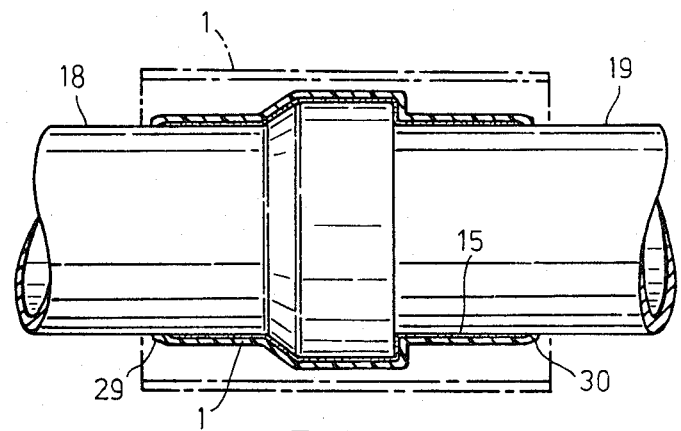
FIG. 11

HEAT SHRINKABLE COVERING

The invention relates to heat shrinkable coverings. Heat shrinkable coverings, for example of polymeric materials, are used to seal or to protect pipe weld joints, telephone cables, electrical splices, pipelines and the like from adverse environmental conditions such as corrosion and moisture.

Heat shrinkable tubular sleeves are known. These can provide an excellent seal and protection around articles to which they are applied. One limitation of their use is, however, that they can not be applied to continuous pipelines or the like, which have no accessible exposed end over which the tubular sleeve can be fitted. Further, the known tubular sleeves are usually formed by extrusion and there are practical limits on the diameters of tubes that can be extruded, at least with the conventional extrusion equipment.

So-called "wrap-around sleeves" are also known. These are heat-shrinkable sheets which are adapted to be wrapped around the article to be sealed or protected and then to have the edges of the sheet joined together to form a sleeve. Some forms of wrap-around sleeve employ mechanical fastening devices to connect the edges of the sheet together. The mechanical connection is intended to prevent the edges of the sheet from separating when the sheet is shrunk down. Prior devices of which the applicant is aware have, however, been difficult or inconvenient to connect together, have provided a connection which tends to be weakened or destroyed on heating, and have tended to leave elements of the fastening devices protruding from the completed shrunk-down sleeve, which can present risk of the protruding elements engaging with or snagging on adjacent conduits or cables and cutting into relatively soft, e.g. plastic, protective coverings of the latter, thus leading to the possibility of ingress of moisture, corrosion, leaks and short circuits.

The present invention provides a heat shrinkable covering adapted to be wrapped around an article, comprising a flexible sheet that is heat shrinkable in a longitudinal direction and has two longitudinally spaced transversely extending parallel zones adapted to be brought into superimposed overlapping relationship when the sheet is applied to the article, a heat-resistant stiffening member offering differential rigidity connected along each zone and providing relatively more rigid resistance to longitudinal deformation of the zone in the plane of the sheet and providing relatively less resistance to deformation of the zone in directions perpendicular to the plane of the sheet, one of said stiffening members, of one zone adapted to form the overlap portion, being formed with a series of transversely spaced holes through it, and the other stiffening member, of the zone adapted to form the underlap portion, having connected to it a series of stud members securable through said holes, respectively, each stud member comprising arm portions which are malleable and can be spread apart and flattened onto the upper surface of the overlap portion to couple said one stiffening member and its overlap portion relative to the other stiffening member and its underlap portion, the coupled stiffening members resisting deformation forces tending to separate the overlapped zones longitudinally while permitting the zones to be deformed together inwardly toward a profile of the article underlying the zones when the sheet is wrapped around the article and is heat shrunk.

The superimposed zones of the sheet can be engaged with one another relatively easily in a confined space, e.g. in a pit dug out to expose an underground pipe or other conduit. The spreadable and flattenable arm portions serve to retain the superimposed portions securely together during and subsequent to the shrinking-down operation, and the flattened arm portions avoid or reduce risk of engagement or snagging of the shrunk-down sleeve on adjacent conduits and reduce risk of cutting into or other interference with the protective coverings of adjacent conduits.

In one highly preferred form, the arm portions of the stud member form, adjacent the upper end, a laterally resiliently compressible head portion which is of increased lateral dimension and which snap fits through holes formed through the sheet adjacent the holes in the stiffening member of the overlap portion. In many cases, the covering is relatively stiff and tends to spring upwardly in the course of applying the overlap portion over the underlap. The snap fitting arrangement greatly facilitates in positioning the portions and locating them in the desired superimposed relationship until they have been more securely coupled together by flattening the arm portions.

The stiffening members can readily be made of metal, a heat resistant polymer, a polymer composite, e.g. fibre reinforced plastic, or some other material that will withstand the heat to which they are subjected during the heat-shrinking operation, so that the strength and integrity of the covering are not impaired by the heating.

The covering is well adapted to be manufactured employing sheet material which is provided with its heat shrink property by an operation in which a continuous length of the sheet material is subjected to stretching in its longitudinal direction. In order to provide coverings of increased width, the sheet may, if desired, be a length severed from an extruded or other continuous sheet material stretched in its transverse direction thus imparting a heat shrink property in a direction extending transversely of the original continuous sheet material.

Further advantages of the arrangement of the present invention will become apparent from the following detailed description, given by way of example only, with reference to the accompanying drawings, in which:

FIG. 1 shows a perspective view of one form of covering in accordance with the invention;

FIG. 2 shows an end view of the covering of FIG. 1;

FIG. 2A is a fragmentary perspective view showing a modified form of stud;

FIG. 5 shows a side view, partly in section, of the covering applied to a pipe joint;

FIG. 6 shows a perspective view of a presently preferred form of covering in accordance with the invention;

FIG. 7 is a fragmentary perspective view of a preferred form of stud and its connection to a stiffening member;

FIG. 8 shows a longitudinal section through the covering of FIG. 6;

FIG. 11 shows a side view partly in section of the covering of FIG. 6 applied to a pipe joint.

Figure 3:
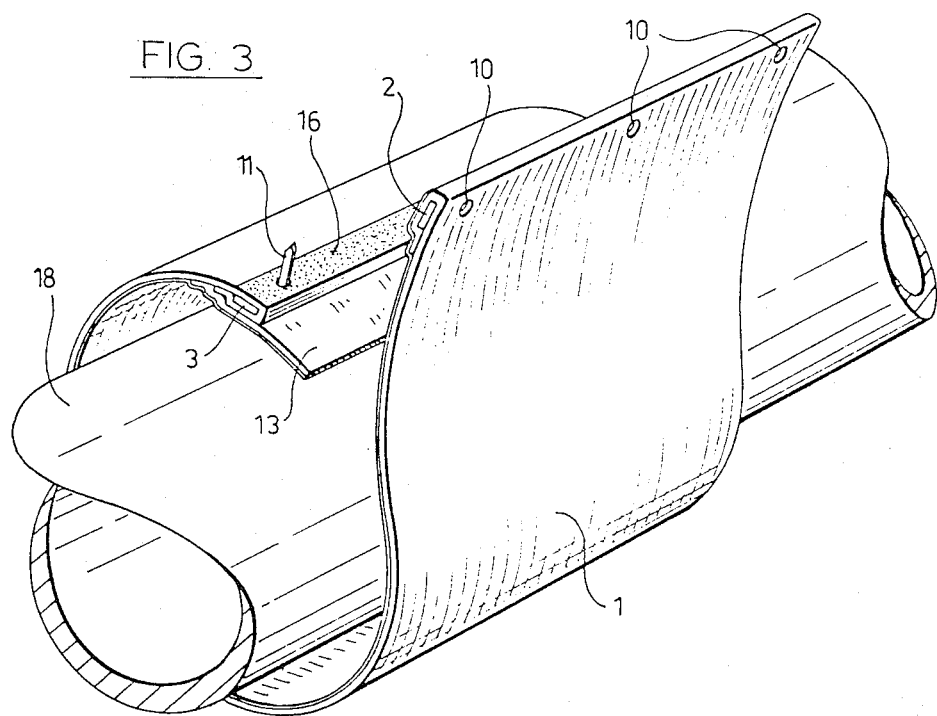
FIGS. 3 and 4 show successive stages in the sequence of applying the covering to an article to be wrapped.

Referring to the drawings, wherein like reference numerals indicate like parts, these show a heat recoverable sheet 1. In a typical example, the sheet 1 is a flexible crosslinked polymeric material which has been subjected to an expansion procedure along one axis in such manner that it retains a memory of its original shape. On heating to a certain temperature or temperature range, the sheet shrinks down to its original configuration. In the present case, the sheet has been expanded in such manner that, on being heated, it shrinks down along its longitudinal direction, indicated by the double-ended arrows in FIGS. 1 and 6.

Examples of polymeric or other materials that may be employed in the fabrication of heat recoverable sheets, the procedures employed in the fabrication of the sheet, and the procedures employed in imparting to the sheet a heat-recoverable property, are all well known to those skilled in the art, and need not be discussed in detail herein. It may, however, be noted that the sheet 1 as shown may be a piece severed from a continuous length of heat-recoverable sheet. As will be appreciated by those skilled in the art, the sheet 1 illustrated may be very readily formed by extruding a continuous sheet to the required width, and subjecting it to a stretching operation along its longitudinal axis. Such stretching operation may be employed using high speed, highly efficient machinery. This machinery may, for example, comprise rolls around which the continuous sheet is led, some of these rolls being run at differential speeds in order to stretch the sheet longitudinally between them. If desired, however, an extruded sheet may, however, be subjected to a stretching operation in which the sheet is stretched transversely, e.g. by employing tentering apparatus.

Further with reference to FIGS. 1 and 6, transversely extending zones at opposite ends of the sheet 1 are stiffened with transversely extending stiffening members 2 and 3 which are connected to these transversely extending parallel zones so as to afford desired longitudinal rigidity characteristics to these zones. In the examples illustrated, the stiffening members 2 and 3 are in strip form and, as best seen in the end view in FIGS. 2 and 8, have an elongated, rectangular cross-section, with the elongated axis of the cross-section disposed parallel to the plane of the adjacent end zone of the sheet 1. The strips 2 and 3 are of a bendable, heat-resistant material, whose property of stiffness sufficient to resist separation of the juxtaposed zones is retained at the temperatures attained during heat shrinking of the sheet. As will be appreciated, owing to the geometry of the cross-sections of the strips, they can more readily be bent about bending lines extending transversely of the strips, but they function somewhat like a cantilever support and resist deformation in directions parallel to their planes.

In the examples shown in FIGS. 1, 2, 2a, and 6 to 8, the stiffening strips 2 and 3 are connected to the end zones by being encapsulated within respective pockets formed by folding over an end portion 4 or 5 of the sheet and connecting it to the underside of the sheet 1, e.g. by fusing or welding or adhesively bonding, at 7 and 8. The end portion 4 or 5 may be first wrapped somewhat loosely around the strip 2 or 3 and, after the connection 7 or 8 has been effected, the pocket thus formed is shrunk down by heating the portions 4 and 5 and the adjacent upper portions of the sheet 1 in order to shrink this down thus tightly encapsulating the strips 2 and 3 as shown in FIG. 2.

Each stiffening strip 2 and 3 is formed with a series of through holes 9 spaced apart at points along its length. In fabricating the covering of FIGS. 1 to 5, after the strips 2 and 3 have been tightly encapsulated within the pockets formed by the folded over portions 4 and 5, holes 10 may be formed through the adjacent portions of the sheet 1 and through the folded over portions 4 and 5 in registry with the holes 9 in the strips 2 and 3.

Fastener studs are inserted through the holes 9 through the strip 3. In the example shown in FIGS. 1 to 5, each stud 11 comprises a pair of blade-like arm portions connected together on a common foot portion 12. The foot portion 12 is of somewhat wider diameter so that it will not pass through the holes 9 in the strip 3 to which the studs 11 are applied. These studs 11 may be similar to conventional paper fasteners.

Adjacent one end, the sheet 1 is provided with an underflap 13 connected to the side of the sheet 1 which will be the underside in its wrap-around application. In the preferred form, the underflap 13 is of the same material as the main sheet 1, but is dimensionally heat-stable, i.e. it has not been subjected to a stretching operation in the same manner as the main sheet 1, and, when heated, will not alter its dimensions.

Preferably, the underflap 13 is fused to the material of the main sheet along its rear edge at 14 as seen in FIGS. 2 and 8.

The underside of the sheet 1, i.e. the side which forms the innermost surface when the sheet is wrapped around an article and preferably also of the underflap 13, is provided with a functional coating 15, the nature of which may vary according to the application to which the heat shrinkable covering is to be put. The coating may be, for example, a sealant, an adhesive material, a mastic, a grease, or a two-component curable composition. These functional coating materials are all well known to those skilled in the art, and need not be discussed in detail herein. It may be noted, however, that many of these materials may need to be applied to the sheet 1 in a hot, fluid condition. Where, as in the preferred form, the sheet 1 is fabricated employing a continuous, longitudinal stretching operation, the application of these hot coating compositions is much facilitated, as it is relatively easy to maintain tension on the stretched sheet material while applying the hot coating composition to it, thus avoiding or reducing any tendency for the sheet to commence to shrink down as it is heated by contact with the hot coating composition. Such premature shrinkage would, of course, be undesirable, as it would detract from the desired heat shrinkable properties of the sheet. Areas of the sheet 1 which are to be left free from the functional coating may be masked with a suitable paper during the application of the coating. The masking is done at the appropriate spacings, and the bare areas, free from the functional coating, left after removal of the paper masking, may, for example, be used for encapsulating the strips 2 and 3.

Figure 9:
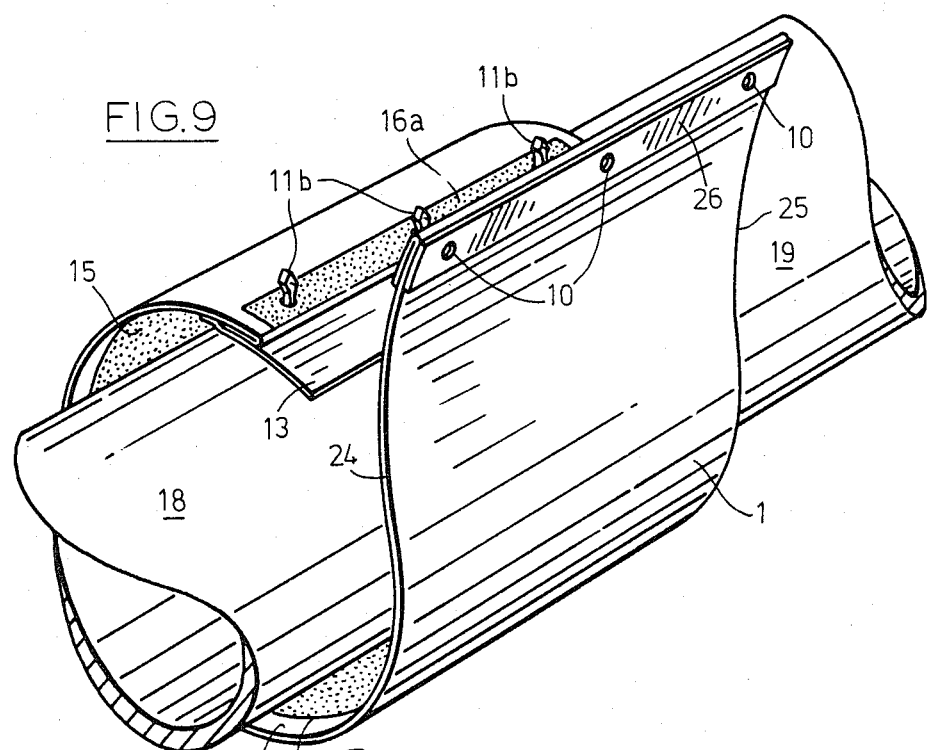
FIGS. 9 and 10 show successive stages in the sequence of applying the covering to an article to be wrapped.

In one preferred form the faces of the sheet 1 at one or both ends adjacent the stiffening members 2 and 3 are provided with a hold-down adhesive to at least temporarily bond the faces together. In the example illustrated in FIGS. 1 to 5, a strip of an adhesive which can form a bond when the ends are pressed together, e.g. a pressure-sensitive adhesive, is provided on both faces. Such strip of adhesive is indicated at 16 on the face adjacent the studs 11 in FIGS. 2 and 3, and the corresponding strip on the underside of the sheet is indicated at 17 in FIG. 2. FIG. 9 shows a pressure-sensitive adhesive layer 16a forming a hold-down layer adjacent the upper face of the underlap portion of the covering. In another preferred form (not shown), the functional coating 15 extends over the lower face of the end portion 4, to form a seal when stiffening member 2 is placed over stiffening member 3.

Figure 4:
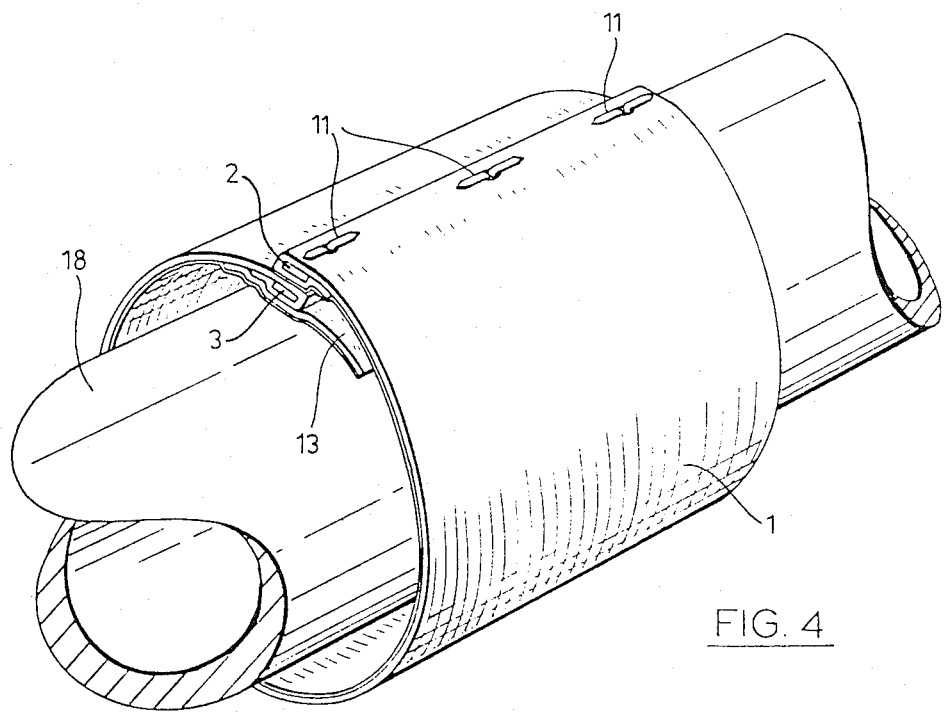

In use of the covering member of FIGS. 1 to 5, as indicated in FIGS. 3 and 4, the sheet 1 is wrapped around an article, e.g. a pipe 18 to be covered, and the studs 11 are passed through the respective holes 9 and 10 in the opposite edge of the sheet 1 and in the stiffening member 2. The blade-like arm portions of the studs 11 are then spread apart, and flattened onto the exterior of the overlap portion, as indicated in FIG. 4. Finger pressure is applied to the overlapped ends of the sheet in order to force the contacting faces of the superimposed portions into tight engagement. The adhesive coatings 16 and 17 assist in retaining these contacting faces in tight engagement while the blades of the studs 11 are being spread apart. Frequently, the covering illustrated will be applied to the wrapping of pipes or other articles having relatively large transitions and pronouncedly varying profiles. In such case, it will usually be desirable to press firmly with the fingers onto the regions of the strip members 2 and 3, in order to bend these inwardly to conform to the profile of the article to be wrapped in the region directly underlying the strips 2 and 3. The thus formed wrap-around sleeve is then shrunk down by heating it, e.g. by playing a blowtorch over its external surface, or applying some other source of heat, to raise the sheet material to a temperature sufficient to result in its longitudinal retraction or shrinking, thereby closing the sleeve tightly down over the article to be covered. FIGS. 5 and 11, for example, illustrate the shrinking of wrap-around sleeves 1 indicated in broken lines down to their shrunk condition indicated in solid lines, wherein the sleeve is applied over a bell and spigot joint formed between a pipe 19 and a pipe 18 having a bell portion 20.

In a typical application, the covering will be employed to form a seal around the article, e.g. the bell and spigot joint illustrated, and, in such case, the functional coating may comprise a sealant or mastic which may be less flowable at ambient temperature and which may be rendered more readily flowable on heat application. The stretched sheet 1 may have a relatively high expansion ratio, which may, for example, range from about 1:1.15 to 1:15, more typically about 1:2 to 1:5, and, for many applications, desirably in the range about 1:2 to about 1:3. As a result of the heat-shrinkage, high hoop stresses will be generated within the sleeve, thus forcing the sheet material 1 into tight embracement around the article, and forcing any functional coating, such as a sealant, mastic or the like to flow into and fill up any surface irregularities or voids in the exterior of the article, thus forming a tight covering and seal around the article.

It will be noted that with the above described arrangement, the upper surface of the flap 13 forms a tight seal with the underside of the superimposed portion of the sheet 1. The flap 13 also serves to cushion the studs 11 and form a barrier between these and the article to be wrapped, thus reducing any risk of the inwardly-directed resultant of the hoop stresses tending to urge portions of the studs, e.g. the enlarged foot portion 12, inwardly to penetrate any underlying functional coating. Where, as will be usual, the studs 11 are of metal or some other relatively good thermal or electrical conductor, the underflap 13 insulates the studs 11 from any underlying functional coating, e.g. the coating 15, and reduces any risk of undesirable contact with the surface of the article being covered, sealed, or protected.

With the arrangement shown, the stiffening members 2 and 3 are provided with coupling means such as the studs 11 and holes 9 for coupling the stiffening members 2 and 3 together at a number of discrete, transversely spaced apart coupling points. This provides means whereby the stiffenng members can be conveniently coupled together and located relative to one another in a manner which will withstand the forces tending to separate the stiffening members 2 and 3 under the action of the hoop stresses generated in the sheet 1 during the heat shrinking operation.

A form of resilient metal stud 11a as illustrated in FIG. 2 may be employed in place of the blade-like stud members 11. At their widest portion, the two arm portions of the studs 11a are spaced apart by a distance greater than the diameters of the holes 10 through the sheet 1 adjacent the strip member 2 at the opposite end, so that the studs 11a snap-fit through the holes 10 when the strips 2 and 3 are superimposed and urged toward one another. Preferably, the diameters of the holes 10 in the sheet 1 adjacent the strip 2 are slightly smaller than the holes 9 through the latter. The arm portions of the studs 11a at their widest portion may be slightly smaller than the width of the holes 9, although it is also possible to have the holes 9 of smaller diameter than the widest portion of the studs 11a so that these snap fit through the holes 9. After the strips have been located relative to one another in superimposed relationship, the resilient metal studs 11a may be permanently deformed or flattened downwardly, e.g. by a hammer blow, to conform them to the exterior surface of the sheet 1, so that no part protrudes above the surface of the sheet. The lower end of each stud 11a may be located within or below the underside of the strip member 3 e.g. by an enlarged foot portion not visible in FIG. 2a similar to the foot portion 12 on the stud members 11 shown in FIG. 2. Various other types of spreadable and flattenable fasteners can be used to connect the members 2 and 3, e.g. other types of snap fasteners such as dome snap fasteners, similar to the snap fasteners used on clothing articles. The fastening should be sufficiently rigid to resist the deformation forces tending to separate members 2 and 3 and should be heat resistant.

In the presently preferred form, a stud 11b formed of resilient metal is employed as illustrated in FIGS. 6 to 12. This has arm portions 21 forming adjacent the upper end of the stud an approximately diamond shape enlarged head which is laterally resiliently compressible in the direction tending to close the sides of the diamond, a lower body portion of reduced width, and laterally extending foot portions 22 of increased width. The stud is a one-piece structure, with the arm portions 21 being integrally joined at the apex of the diamond.

The studs 11b are assembled to the stiffening member 3 by passing their heads through the holes 9. The foot portions 22 engage the adjacent under surface of the stiffening member 3. In the example shown in FIGS. 6 to 8, the studs 11b, assembled to the stiffening member 3, are passed through the holes 10 pre-cut in the sheet 1 before the portion 5 is folded over and connected to the underside of the sheet 1.

As is best seen in FIG. 7, each arm portion 21 of the stud 11b is of strip material of an elongated generally rectangular cross-section. Desirably, each arm portion 21 is disposed so that the longer dimension of said cross-section extends parallel to the longitudinal direction of the sheet 1, i.e. parallel to the axis along which the sheet 1 shrinks in use.

Figure 12:
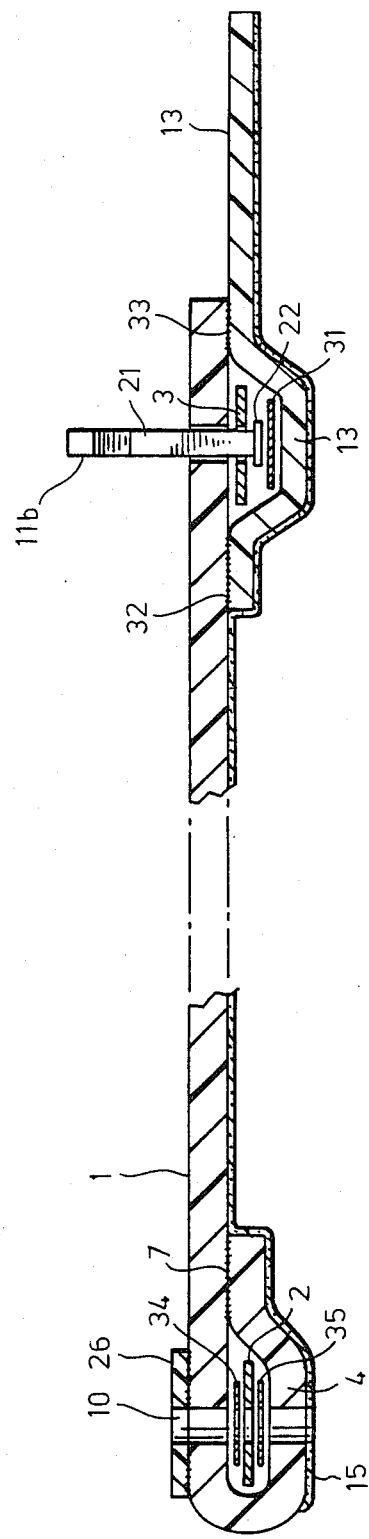
FIG. 12 shows a longitudinal section through a further preferred form of covering in accordance with the invention, shown partially exploded.

In the example shown in FIG. 12, the end of the sheet 1 adjacent the strip 3 is not folded over. The flap 13 is applied over the strip 3 having the studs 11b assembled to it, with the studs 11b passed through the holes 10 in the sheet 1. The strip 3 is located and secured relative to the flap 13 by a double-sided adhesive tape 31. The flap 13 is connected to the sheet 1 along the zones 32 and 33 by welding or adhesively bonding, thus encapsulating the strip 3. Further, the strip 2 is located and secured relative to the sheet 1 and the folded over portion 4 by two double sided adhesive tapes 34 and 35 before the portion 4 is connected to the sheet along the zone 7.

Figure 10:
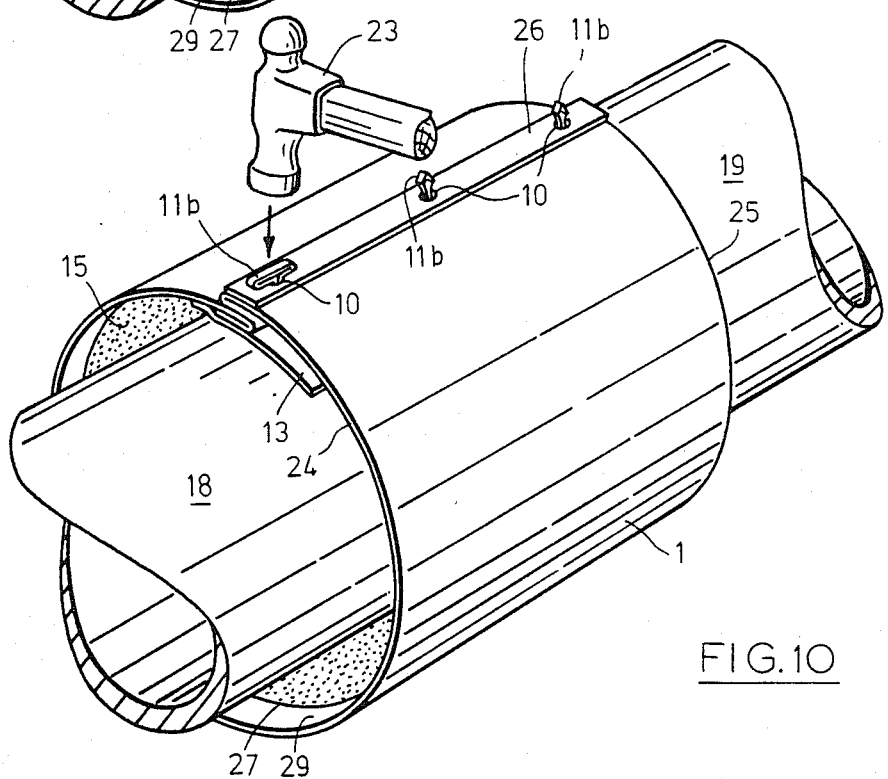

In use, as illustrated in FIGS. 9 and 10 the enlarged heads of the studs 11b snap fit through the holes 10 in the sheet 1 adjacent the stiffening member 2 of the overlap portion and pass through the holes 9 formed through the strip 2. As before, the holes 10 in the sheet may be of slightly smaller diameter than the holes 9 in the strip 2. Once the stud 11b is snap fitted through the hole 10, the overlap portion is retained quite firmly adjacent the underlap portion in the position shown in FIG. 10, thus avoiding difficulties in positioning the overlapped portions relative to one another owing to the tendency of the usually relatively stiff material of the sheet 1 to cause the overlap portion to spring upwardly and outwardly away from the underlap portion.

Before heat shrinking the covering member, the studs 11b are subjected to pressure sufficient to permanently deform them to a spread and flattened condition, e.g. with a blow from a hammer 23 as shown in FIG. 10. Alternatively, the studs 11b may be flattened using a special tool, e.g. a tool similar to a pair of pliers having a slot extending longitudinally inwardly from the tip of one of jaws of the pliers, to receive the relatively narrow body portion of the stud, while the other jaw, in the open position of the jaws, extends above the diamond shape head of the stud 11b and is manipulated to press the head and the upper part of the body portion into the spread and flattened condition.

As will be noted from FIGS. 8 and 12, in the preferred form, the stiffening member 3 together with the foot portions 22 of the studs 11b is enwrapped in the pocket formed by the folded over portion 5 of the sheet 1 or by the flap 13, and the lower portion of the stud 11b does not extend through the portion 5 or flap 13. Desirably also, as best seen in FIG. 6, the ends of the strips 2 and 3 are spaced inwardly from the longitudinal edges 24 and 25 of the sheet 1, and the edges of the folded over portions 4 and 5, or, in the example of FIG. 12, the end edges of the flap 13, are connected to the underside of the sheet 1, e.g. by fusing or welding or adhesive bonding so that the strips 2 and 3 are encapsulated and are not exposed at their ends, where, in the case in which they are of metal, they would be liable to come into contact with other metal elements or with the surface of a metal pipe or other conduit around which covering is wrapped and lead to the possibility of a differential metal cell being set up, with resultant corrosion.

A covering of material which is dimensionally stable on heating may be provided on the upper face of sheet 1 adjacent the end which forms the overlap portion. As shown in FIGS. 6 to 12, this covering may be in the form of a strip 26 and has the holes 10 formed through it corresponding in position to the holes 9 in the stiffening member 2. Usually, the strip 26 will be of the same material, e.g. a crosslinked polymeric material, as the sheet 1, but has not been subjected to a stretching operation. The strip 26 is connected to the upper side of the sheet 1 at least around the periphery of the holes, and more usually is connected over the whole area of the strip by welding or fusing, or by adhesive bonding, and serves to preserve the integrity of holes 10 so that on heating these do not tend to elongate or pull away longitudinally from the underlying holes 9 in the stiffener member 2, which might lead to portions of the stiffener member 2 adjacent the holes 9 being exposed in the shrunk-down covering.

In some cases, the functional coating 15 does not cover the whole width of the sheet 1 but as best seen in FIG. 6, has its longitudinal edges 27 and 28 spaced inwardly from the edges 24 and 25 of the sheet, leaving exposed longitudinal margins 29 and 30 of the sheet 1. This reduces any tendency for the functional coating 15 to spread laterally or ooze out beyond the ends of the covering when the sheet 1 is shrunk down onto an article, e.g. the bell and spigot pipe joint illustrated in FIG. 11, and the functional coating tends confined between the margins 29 and 30 which are drawn into tight sealing contact with the article, e.g. the surfaces of the pipes 18 and 19, particularly in the case in which the functional coating is melted or made more readily flowable during the heating of the sheet in the shrinking-down operation.

The function of the stiffening members 2 and 3 is to support the edges of the sheet intermediate the coupling points, e.g. the studs 11, 11a or 11b and the holes 10, and to provide relatively more rigid resistance to longitudinal deformation of the edges of the sheet such as would tend to result in the superimposed edges separating from one another under the hoop stresses generated in the sheet when it is shrunk down. At the same time, the stiffening members 2 and 3 are relatively more flexible with respect to being bent downwardly toward the underlying profile of the article to be wrapped, e.g. the bell and spigot joint illustrated in FIGS. 5 and 11. In the example illustrated, this is achieved with strip members 2 and 3 that are of an elongated, rectangular cross-section, as seen in FIGS. 2 and 8, so that they are relatively resistant to bending or other deformation in directions parallel to the plane of the sheet 1. Owing to the relatively thinner cross-section in the direction perpendicular to the sheet 1, the strip members are, however, relatively more readily bendable to permit them to deform downwardly perpendicular to the plane of the sheet 1. The stiffening members 2 and 3 may be, for example, metal strips which are relatively more easily plastically deformable by bending them out of the plane of the sheet 1. The use of stainless steel or other relatively inert metal as the material of the strip 2 and 3 may be preferred, particularly where in service the wrapped article will be exposed to a moist or other corrosion-inducing environment. Merely by way of example it may be mentioned that the strips may be of stainless steel about 4 to about 20 ml in thickness and about ½ to about 1 inch in width. Plastic strips may also be employable, e.g. fibre reinforced plastic strips.

Instead of employing a stiffening member which is a one-piece integral strip, composite stiffening members may be employed. For example, the strip may be composed of a series of hinge elements each articulated to its neighbour along a pivot axis extending parallel to the longitudinal stretching axis of the sheet indicated by the double-ended arrow in FIGS. 1 and 6. Such articulated strip may be formed so as to be highly flexible with respect to bending out of the plane of the sheet 1. The resultant forces of the circumferential hoop stress generated on heat shrinking may themselves be sufficient to flex the strips and conform them closely to the profile of the article to be wrapped, without requiring any separate step of forcefully bending the stiffening members down into conformity with the profile of the article before commencing the heating operation.

Other variants may be employed. The stiffening members 2 and 3 may be connected on the end zones of the sheet 1 by bonding them firmly thereto, e.g. by applying the stiffening member to one face of the sheet 1, applying a discrete strip of the flexible sheet material over the stiffening member, and bonding or fusing this to the main sheet at its marginal edges on either side of the stiffening member. Further, the sheet material may be extruded with the metal strips or other stiffening members 2 and 3 embedded within the opposite edge portions of the extrusion. This arrangement requires the extruded sheet to be subsequently stretched transversely with respect to its original direction of extrusion in order to impart to it the desired heat-shrink property, and would require that the stud elements 11, 11a or 11b be inserted from the underside of the sheet 1 into holes formed through the stiffening member 3 and the adjacent portions of the sheet 1, along the lines of the arrangement shown in FIG. 2.

In order to provide a smoother surface on the sleeve and protect the coupling members such as the studs 11, 11a or 11b, small adhesive-coated patches of the sheet material may be applied over the ends of the coupling members, e.g. over the flattened down ends of the studs 11, 11a or 11b before or after the heating operation.

We claim:

1. A heat shrinkable covering adapted to be wrapped around an article, comprising a flexible sheet that is heat shrinkable in a longitudinal direction and has two longitudinally spaced transversely extending parallel zones adapted to be brought into superimposed overlapping relationship when the sheet is applied to the article, a heat-resistant stiffening member offering differential rigidity connected along each zone and providing relatively more rigid resistance to longitudinal deformation of the zone in the plane of the sheet and providing relatively less resistance to deformation of the zone in directions perpendicular to the plane of the sheet, one of said stiffening members, of one zone adapted to form the overlap portion, being formed with a series of transversely spaced holes through it, and the other stiffening member, of the zone adapted to form the underlap portion, having connected to it a series of stud members securable through said holes, respectively, each stud member comprising arm portions which are malleable and can be spread apart and flattened onto the upper surface of the overlap portion to couple said one stiffening member and its overlap portion relative to the other stiffening member and its underlap portion, the coupled stiffening members resisting deformation forces tending to separate the overlapped zones longitudinally while permitting the zones to be deformed together inwardly toward a profile of the article underlying the zones when the sheet is wrapped around the article and is heat shrunk, and wherein the arm portions of each stud member form adjacent the upper end of the stud member a laterally resiliently compressible head portion of increased lateral dimension adapted to snap fit through the hole of said one stiffening member or through a hole in the sheet adjacent thereto.

2. A covering as claimed in claim 1 wherein each stud member is a one-piece structure having said arm portions integrally joined above the head portion, a body portion received in a hole formed through said other stiffening member, and a foot portion extending laterally from the body portion and engaging the adjacent under surface of the stiffening member.

3. A covering as claimed in claim 1 wherein said arm portions form a generally diamond-shape head portion.

4. A covering as claimed in claim 1 wherein each stud member is formed of resilient metal strip.

5. A covering as claimed in claim 1 having adhesive on at least one of the contacting faces of the superimposable zones, for retaining the faces together while effecting the coupling.

6. A covering as claimed in claim 5 having adhesive on both of the contacting faces.

7. A covering as claimed in claim 5 in which the adhesive is pressure-sensitive adhesive.

8. A covering as claimed in claim 1 in which each stiffening member comprises a strip having an elongated cross-section disposed parallel to the plane of the zone.

9. A covering as claimed in claim 8 in which the strip is a one-piece member extending continuously transversely across the sheet.

10. A covering as claimed in claim 8 in which the ends of the strip are spaced inwardly of the longitudinal edges of the sheet.

11. A covering as claimed in claim 8 in which the strip is encapsulated within the material of the sheet.

12. A covering as claimed in claim 11 in which at least one stiffening member is retained in a pocket formed by folding over one end of the sheet and bonding it to an inner margin of the sheet.

13. A covering as claimed in claim 12 in which the end forming the pocket is bonded to a side of the sheet adapted to form an inner side of the covering.

14. A covering as claimed in claim 12 in which the end is fused to the sheet.

15. A covering as claimed in claim 12 in which the material of the pocket is heat shrunk down and tightly encapsulates the stiffening member.

16. A covering as claimed in claim 12 wherein the stiffening member is located relative to the inner side of the pocket by a double-sided adhesive tape.

17. A covering as claimed in claim 8 in which the strip is of a metal capable of withstanding the heat applied thereto when the sheet is shrunk down.

18. A covering as claimed in claim 8 in which the strip is of a fibre-reinforced plastic capable of withstanding the heat applied thereto when the sheet is shrunk down.

19. A covering as claimed in claim 1 in which said zones are at the edges of the sheet.

20. A covering as claimed in claim 1 including a flexible flap connected on one side of the sheet adjacent one edge and adapted to underlie the opposite edge of the sheet when wrapped around an article.

21. A covering as claimed in claim 20 in which the flap is connected on a side of the sheet adapted to form an inner side when the sheet is wrapped around the article.

22. A covering as claimed in claim 20 in which the flap is fused to the sheet.

23. A covering as claimed in claim 20 in which the flap is of the same material as the sheet but is dimensionally stable on heating.

24. A covering as claimed in claim 20 in which the flap is connected to the underside of the sheet on opposite edges of said one stiffening member and forms with the underside of the sheet a pocket enclosing said one stiffening member.

25. A covering as claimed in claim 24 in which said one stiffening member is located relative to the flap by a double-sided adhesive tape.

26. A covering as claimed in claim 1 including on the outer side of the zone adapted to form the overlap portion a layer of material which is dimensionally stable on heating and bonded to said outer side at least around the periphery of the holes therethrough.

27. A covering as claimed in claim 26 in which said layer is a continuous strip bonded to said outer side.

28. A covering as claimed in claim 26 in which said layer is of the same material as the sheet.

29. A covering as claimed in claim 1 having a functional coating on a side of the sheet adapted to form an inner side of the covering.

30. A covering as claimed in claim 29 in which the functional coating extends on at least one of the contacting faces of the superimposable zones.

31. A covering as claimed in claim 29 wherein the functional coating is melted or rendered flowable on heating and its edges are spaced inwardly from the longitudinal edges of the sheet.

32. A covering as claimed in claim 1 in which the sheet is a heat recoverable polymeric material.

33. A covering as claimed in claim 1 in which the sheet has an expansion ratio from about 1:1.15 to 1:15.

34. A covering as claimed in claim 33 in which the ratio is of about 1:2 to 1:5.

35. A covering as claimed in claim 33 in which the ratio is about 1:2 to about 1:3.

* * * * *